United States Patent [19]

Lang et al.

[11] Patent Number: 4,779,923

[45] Date of Patent: Oct. 25, 1988

[54] REFRIGERATING DEVICE ARRANGEMENT FOR VEHICLES

[75] Inventors: Hans-Jürgen Lang, Wehretal; Heinz Lenfort, Saerbeck, both of Fed. Rep. of Germany

[73] Assignee: WAECO Wahning & Co. GmbH, Emsdetten, Fed. Rep. of Germany

[21] Appl. No.: 942,508

[22] Filed: Dec. 15, 1986

[30] Foreign Application Priority Data

Dec. 17, 1985 [DE] Fed. Rep. of Germany ....... 3544491

[51] Int. Cl.⁴ .............................................. B60N 3/10
[52] U.S. Cl. ..................................... 297/194; 62/244; 296/37.8; 297/113; 297/180; 297/217
[58] Field of Search ............... 297/113, 180, 188, 191, 297/194, 217, 238; 62/239, 244; 296/37.8

[56] References Cited

U.S. PATENT DOCUMENTS

| 2,025,393 | 12/1935 | Kupfer | 297/191 X |
| 2,358,071 | 9/1944 | Hurtado | 62/244 X |
| 2,525,952 | 10/1950 | Saterlie et al. | 297/188 X |
| 2,917,107 | 12/1959 | Bloom et al. | 297/113 |
| 3,951,448 | 4/1976 | Harvie | 297/113 |
| 4,545,211 | 10/1985 | Gaus | 62/244 X |

FOREIGN PATENT DOCUMENTS

| 2536854 | 3/1977 | Fed. Rep. of Germany | 296/37.8 |
| 2758066 | 6/1979 | Fed. Rep. of Germany | |
| 2951052 | 6/1981 | Fed. Rep. of Germany | |
| 198138 | 12/1982 | Japan | 296/37.8 |
| 327905 | 4/1930 | United Kingdom | 297/113 |

Primary Examiner—Kenneth J. Dorner
Assistant Examiner—Peter R. Brown
Attorney, Agent, or Firm—Tarolli, Sundheim & Covell

[57] ABSTRACT

A refrigerating device for holding food or drinks or other objects fitted with a front cover for opening and closing is arranged between the back rests of two seats spaced relative to each other in a vehicle and may be covered by an arm rest which may be folded up against the front wall of the refrigerating device, thereby optimizing the utilization of space in the vehicle.

10 Claims, 3 Drawing Sheets

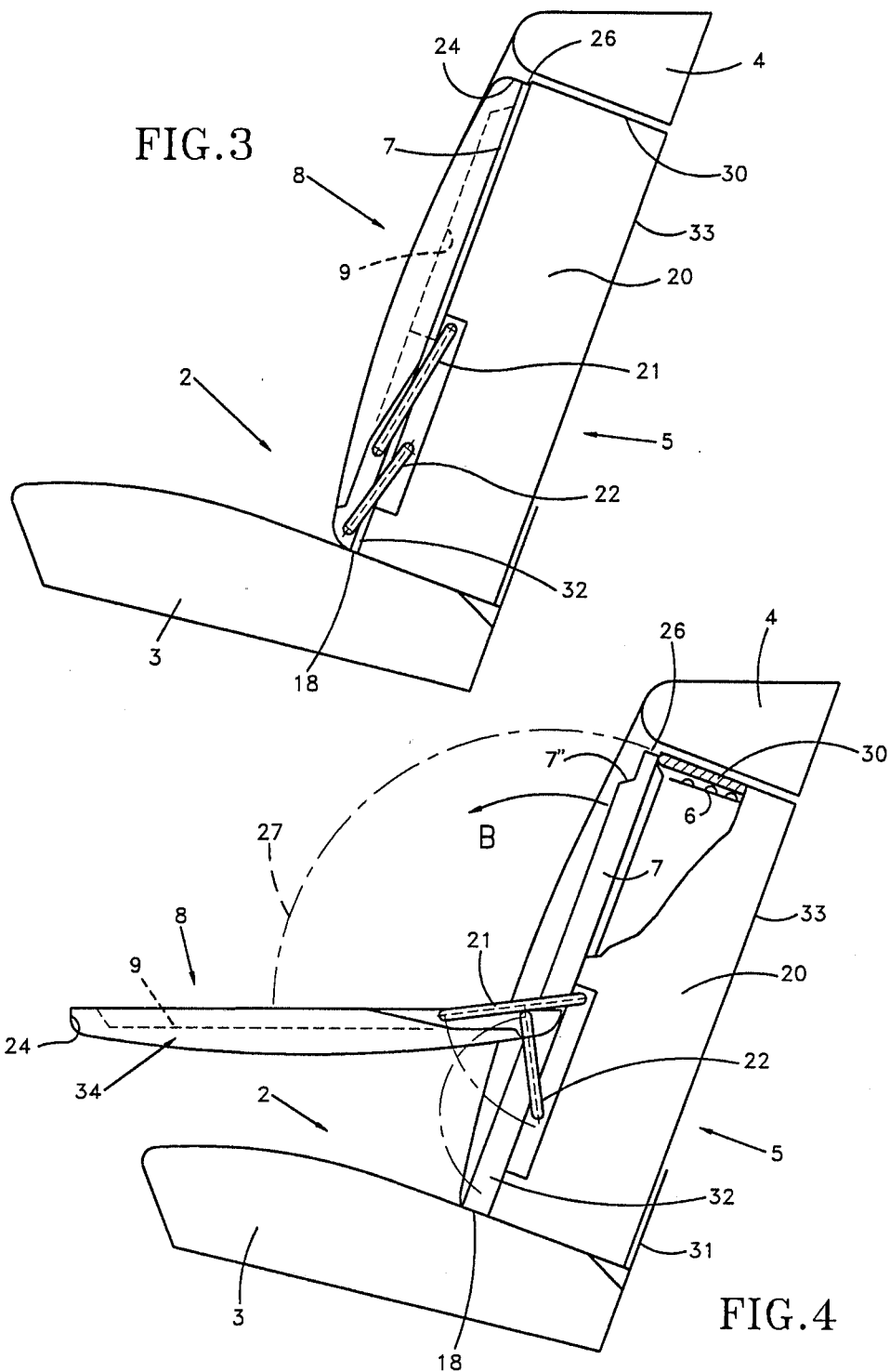

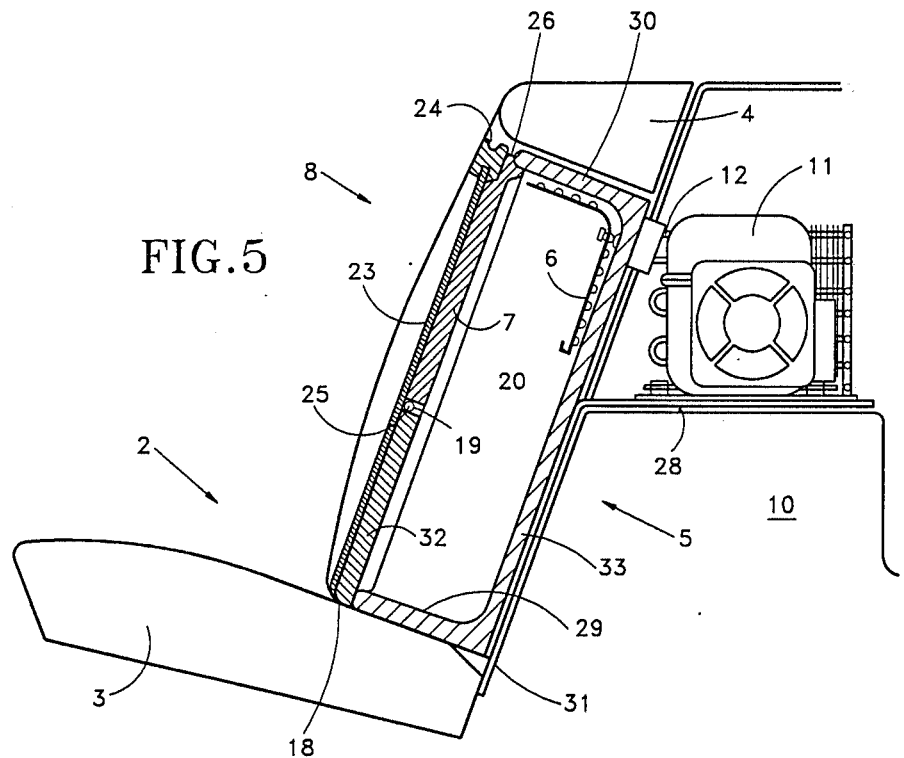
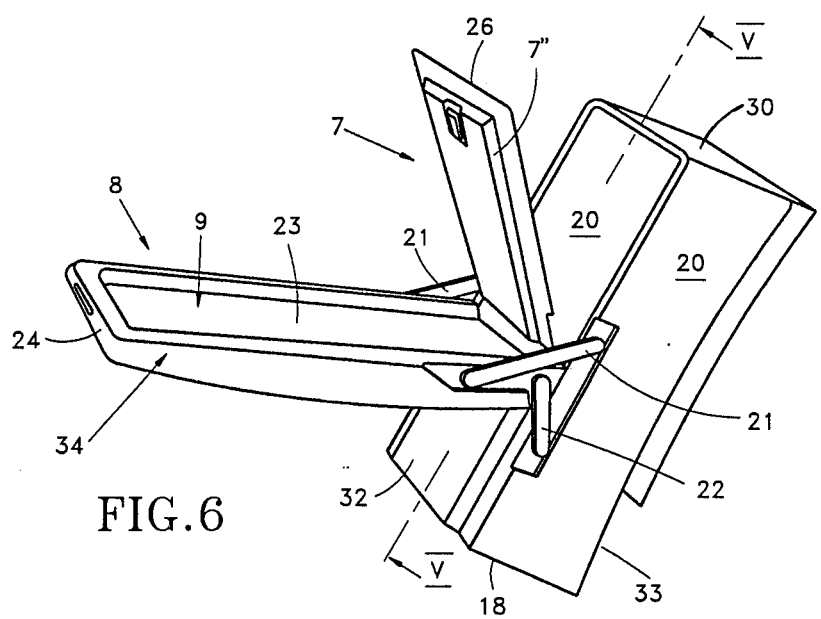

REFRIGERATING DEVICE ARRANGEMENT FOR VEHICLES

BACKGROUND OF THE INVENTION

1. Field of the Invention

The present invention relates to a refrigerating device arrangement with a refrigerating device arranged between the back rests of two adjacent vehicle seats, the front surface of said refrigerating device being preferably in the same plane as said back rests, when said refrigerating device is closed.

2. Prior Art

West German patent application No. 29 51 052 divulges an arm rest which folds back into a space between two seats accomodating a flat table, the arm rest resting against the back of said table when folded up. When said arm rest is folded down, said table may also be folded down and may be used for placing cups, glasses or the like thereon, said table having a holder to prevent said glasses, cups or the like from moving or falling over as the vehicle accelerates or decelerates. The arrangement known from the above-referenced patent application is not fit for accomodating a bin or a cabinet having a front cover for opening and closing between the back rests of two seats being spaced relative to each other.

West German patent application No. 27 58 066 describes a seating system for automobiles providing for a permanent arm rest between two seats, said arm rest covering a cabinet below said arm rest. For access to said cabinet, the front part of said arm rest at the far end from the back rests of said seats is folded forward, the arm rest then no longer serving as an arm rest, but supporting a table device integrated into part of the seat back rest. Said arm rest cannot, therefore, serve as a back rest.

U.S. Pat. No. 2,525,952 discloses a cabinet arranged behind the back rest of a seat for several persons, said cabinet having no front and no top cover. Said arrangement reduces the space available behind said back rest mainly in the trunk for stowing baggage and the like and is associated with the inconvenience that parts placed in said cabinet must be secured since they may otherwise fall out of said cabinet. Furthermore, the floor of said cabinet is clearly higher than the seat, thereby limiting the height of said cabinet. For access to said cabinet, part of the back rest of said seat must be folded forward, the back of said folded back rest being at the same height as the floor of said cabinet.

SUMMARY OF THE INVENTION

It is an objective of the present invention to provide for a refrigerating device arrangement which makes better use of the space available in a vehicle and provides an arm rest for passengers sitting adjacent to said refrigerating device.

The present invention therefore proposes a refrigerating device arrangement wherein said refrigerating device for holding food, drinks or other objects comprises a front wall with a front cover for opening and closing is arranged between the back rests of two adjacent seats.

A refrigerating device arrangement, as proposed by the present invention, offers the following and other advantages over conventional arrangements:

The cabinet and the arm rest functions are entirely independent of each other without reducing the space available in the vehicle for stowing baggage or the like.

When folded up, the arm rest serves as a back rest and provides thermal insulation for the refrigerating device.

The refrigerating device may be fitted in lieu of a known folding-down arm rest, thereby not using any extra space in the vehicle, whilst preserving the folding-down arm rest function and even allowing the provision of a table.

The design, form, size and material of the above-described refrigerating device and associated components are not subject to any particular restrictions and known conventional criteria may therefore be applied.

Further details, characteristics and advantages of the present invention are divulged in the claims and in the description of the accompanying drawings.

BRIEF DESCRIPTION OF THE DRAWINGS

The refrigerating device arrangement according to the present invention will now be described with the help of two preferred embodiments illustrated in the accompanying drawings in which

FIG. 3 is a side view of another embodiment of the present invention, the arm rest having been folded up;

FIG. 4 is a partly exploded side view of the embodiment of the present invention shown by FIG. 3, the arm rest having been folded down;

FIG. 5 is a vertical section of the embodiment of the present invention shown by FIG. 3 along line V—V in FIG. 6; and FIG. 6 is a view of the embodiment of the present invention shown by FIG. 3, drawn in perspective.

DETAILED DESCRIPTION OF THE INVENTION

Figure 1:
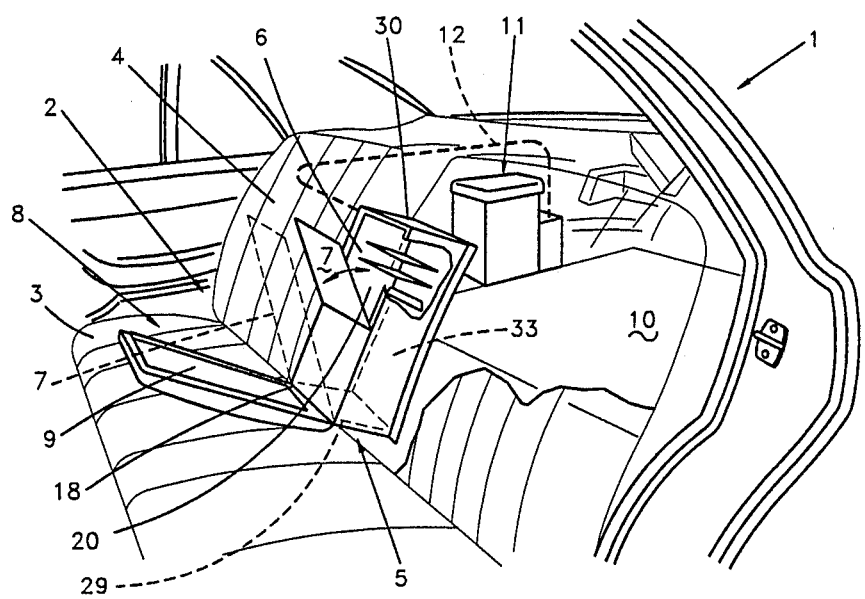
FIG. 1 is a partly exploded view of an embodiment of the present invention wherein a cabinet serving as a refrigerating device is integrated in the rear seat of an automobile.

Referring first to FIG. 1, an automobile 1 comprises a rear seat 2 for two or three passengers, the seating part 3 of said rear seat 2 being continuous, whilst the bottom part of the back rest 4 is split to accomodate a conventional fold-down arm rest. The space provided for said conventional arm rest accomodates a refrigerating device 5 occupying the entire space provided for said conventional arm rest, said refrigerating device 5 having insulated walls and a front opening for access, an evaporator 6 being incorporated inside side device near the roof thereof and said front opening being closed or opened by a front cover 7 or 7'. A fold-down arm rest 8 is fixed to the bottom edge 18 of said refrigerating device 5, the upper surface 9 of said arm rest 8 being integrated into the upholstered back rest 4 of said rear seat 2 when said arm rest 8 is folded up. The cover 7 or 7' of said refrigerating device 5 may be opened or closed or removed from said refrigerating device 5, said cover 7 or 7' being attached to said refrigerating device 5 by hinge means. Said cover may be the upper part (cover 7) or the entire front (cover 7') of the front wall 32 of said refrigerating device 5. FIG. 1 also depicts, by a broken line, a refrigerant line 10 to a refrigeration device 12 accomodated in the trunk 10 of automobile 1.

Figure 2:
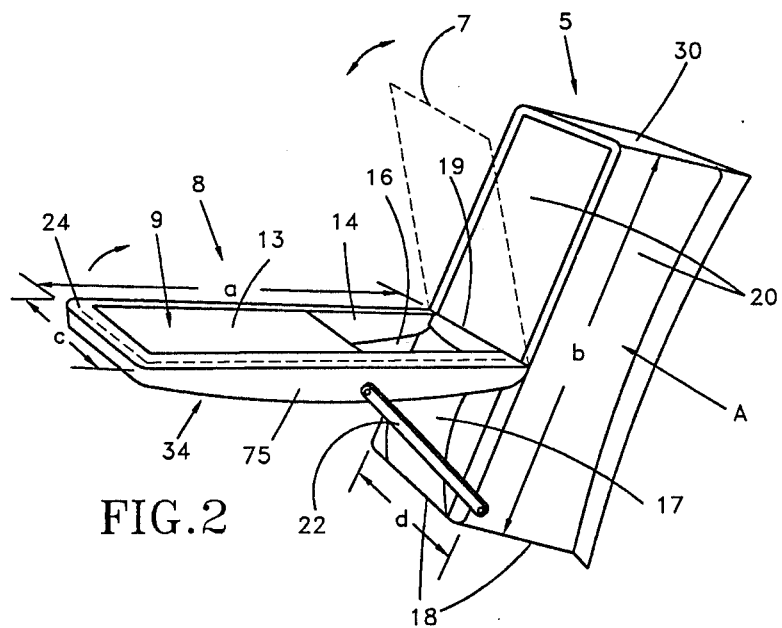
FIG. 2 is a view of a different embodiment of the present invention, drawn in perspective.

The refrigerating device 5 shown in FIG. 2 and representing another embodiment of the present invention is of the same design and of the same size as the refrigerating device 5 in FIG. 1, if the design and the arrangement of the arm rest and the evaporator are neglected.

Whilst, in the embodiment of the present invention depicted by FIG. 1, the arm rest is attached to the bottom edge 18 of refrigerating device 5, the fold-down arm rest 8 shown in FIG. 2 is attached approximately in the center of refrigerating device 5 and comprises a substantially U-shaped frame 34, its length a being (as in the embodiment depicted by FIG. 1) approximately the same as height b of refrigerating device 5 and its width d being (again, as in the embodiment depicted by FIG. 1) approximately the same as width d of refrigerating device 5, height b and width d of refrigerating device 5 completely occupying the space in back rest 4 usually occupied by known fold-down arm rests. A fold-down or removable cover 7 of said refrigerating device 5 extends substantially over the entire width d of said refrigerating device 5 as well as approximately half of the height b of said device 5, thereby preventing objects stored in the bottom portion of said device from falling out of said device, even if said cover 7 is opened, and thence providing, as an additional advantage, more safety in the event of an accident. The arrangement depicted in FIG. 2 also saves energy, as it substantially prevents relatively cold air accumulated near the bottom of said refrigerating device 5 from flowing out of said refrigerating device 5 when said cover 7 is opened. Said cover 7 is entirely concealed by the base part 13 of the arm rest 8, said base part 13 comprising an area for placing objects on the upper side (when said arm rest is folded down) and upholstery on the lower side (when said arm rest 8 is folded down), said upholstery serving as part of the back rest when said arm rest 8 is folded up. The U-shaped borderings 14 and 15 adjoining said base part 13 which may serve as a table when said arm rest 8 is folded down embrace a cut-out area 16 of said arm rest 8 which is entirely filled by preferably heat-insulating upholstery 17 on the front 32 of said refrigerating device 5 when said arm rest 8 is folded up, said borderings 14 and 15 then extending on the sides of said upholstery 17 from the bottom edge 18 of said refrigerating device 5 to the bottom edge 19 of said refrigerating device cover 7 and then being flush with the side wall 20 of said refrigerating device 5.

Referring now to FIG. 3, FIG. 3 is a side view indicated by arrow A in FIG. 2, of a refrigerating device 5 similar to the embodiment of the present invention shown by FIG. 2, said device 5 being integrated between the back rests of vehicle seating, with the cover 7 of said refrigerating device 5 being closed and the arm rest 8 being folded up. Unlike the embodiments of the present invention shown by FIGS. 1 and 2, the embodiment of the present invention depicted by FIGS. 3 through 6 provides for the U-shaped frame 34 to be entirely filled in by a thin plate 23 such as a decorative wooden plate arranged below the upper edge of said frame 34 when arm rest 8 is folded down. Said arrangement creates a flat space between the refrigerating device 5 and the arm rest 8, the refrigerating device 5 and the arm rest 8, when folded up, said space being fit to accomodate, in a preferred embodiment of the present invention, a thicker and thence better insulating part 7" of the cover or the front wall of said refrigerating device 5, the frame 34 also serving as a bordering of said plate 23 which may be used as a table preventing objects on said plate 23 from falling easily over said edge. In the arrangement described herinabove, the upholstery on said frame 34 covers the less insulated outer parts of said refrigerating device 5 where said upholstery has an insulating effect. Said frame 34 is also fit to absorb the forces applied by vehicle passenger arms when said frame 34 is used as an arm rest.

Two supporting devices 21 and 22 preferably arranged along the two side walls of said refrigerating device 5 are attached, by swivelling arrangements, at their one ends to the side walls 20 of said refrigerating device 5 and at their other ends to the U-shaped borderings 14 and 15 respectively of said frame 34. As the arm rest is folded down, the bottom edge of supporting device 21 rests, substantially in its center, on the upper face of the bottom supporting device 22, thereby combining an elegant appearance with sturdy support of the arm rest 8, as neither supporting device 21 nor supporting device 22 enters the empty space between the arm rest 8 and the front wall of refrigerating device 5.

As shown by FIG. 4, the front edge 24 of arm rest 8 moves forward from its position in the back rest 4 depicted in FIG. 3 to an unfolded position, the unattached ends of the U-shaped borderings 14 and 15 moving along the section of a circle represented by a broken line in FIG. 4. When arm rest 8 has been moved forward, cover 7 may be moved forward around hinge 25 as shown by arrow B in FIG. 4 to open refrigerating device 5, the upper edge 26 of cover 7 moving along the section 27 of a circle around the axis of hinge 25 as shown by a broken line in FIG. 4.

As depicted in FIG. 5, a refrigeration means 11 may be mounted in trunk 10 of the vehicle closely behind refrigerating device 5 if a base means 28, such as a base used for the carriage of long goods, is arranged behind the original cut-out for the arm rest 4. However, such a refrigeration means 11 may be accomodated at any other place in trunk 10 or may also be integrated with refrigerating device 5. As FIG. 5 also shows, the side walls 20, the floor 29 and the roof 30 of refrigerating device 5 may be a monolithic structure made preferably from insulating material, said monolithic structure being bolted or otherwise suitably attached to the forward wall 31 of trunk 10 by its rear wall 33 and, as stated above, the refrigerating means 11 may be integrated with or attached to the refrigerating device 5.

The direction of movement of the arm rest 8 shown in FIGS. 2 through 6 may also be opposite to the directions shown in said figures.

As the figures indicate, the arm rest 8 is preferably relatively flat, thereby occupying little space.

The refrigerating device referred to herein may be any cabinet designed for thermal insulation, therefore also allowing food, such as baby food, to be kept warm or to be heated.

We claim:

1. A refrigerating device for a motor vehicle having a seat assembly having two backrest portions defining a space therebetween, said refrigerating device comprising a cabinet for receiving goods and to be located in said space, said cabinet having a front wall with an access opening in an upper portion thereof and a cover for closing said access opening, said cover being movable between an open position in which it uncovers said access opening and a closed position in which it closes said access opening, and an armrest supported for pivotal movement between a folded-up position in which it overlies said front wall and said cover and a folded-down position in which it can support an arm of a vehicle occupant, said armrest when in said folded-down position providing access only to said cover and the upper portion of said front wall defining the access opening, said front wall including a lower portion located below said armrest when said armrest is in said folded-down position, the width and height of said cabinet being of the same dimensions as the width and the height of the space between said backrests, and the length and the width of said armrest being of the same dimensions as the height and the width of said cabinet, respectively.

2. A refrigerating device according to claim 1 wherein said armrest is relatively thin by comparison with the depth of said cabinet.

3. A refrigerating device as set forth in claim 1 wherein said armrest has an upper edge that moves away from said refrigerating device when said armrest moves from said folded-up position to said folded-down position, and a lower edge that moves along said front wall upward when said armrest moves from said folded-up position to said folded-down position, said lower edge being located adjacent to and beneath said cover in said folded-down position of said armrest.

4. A refrigerating device according to claim 1 wherein said armrest is pivotably fixed to said cabinet.

5. A refrigerating device according to claim 1 wherein said armrest comprises a frame which is U-shaped when seen from the top view.

6. A refrigerating device according to claim 1 wherein at least one supporting device is located at a side of said armrest for supporting said armrest in its folded-down position.

7. A refrigerating device according to claim 1, wherein said cabinet comprises two side walls, a floor, a roof and a rear wall, all made as one monolithic unit, said walls having thermal insulation properties.

8. A refrigerating device according to claim 1, wherein said frame is upholstered.

9. A refrigerating device arrangement according to claim 1, wherein a middle portion of said cover is spaced from the edges thereof and projects beyond said edges, and said armrest has a recess for receiving said middle portion therein in the folded-up position of said armrest.

10. A refrigerating device according to claim 1, wherein the thickness of said armrest and said cabinet substantially equals the thickness of said backrests.

* * * * *